United States Patent [19]

Hurst et al.

[11] E Patent Number: Re. 31,686

[45] Reissued Date of Patent: Sep. 25, 1984

[54] REDUCTIVE STRIPPING PROCESS FOR THE RECOVERY OF URANIUM FROM WET-PROCESS PHOSPHORIC ACID

[75] Inventors: Fred J. Hurst; David J. Crouse, both of Oak Ridge, Tenn.

[73] Assignee: The United States of America as represented by the United States Department of Energy, Washington, D.C.

[21] Appl. No.: 432,002

[22] Filed: Jan. 9, 1974

Related U.S. Patent Documents

Reissue of:

[64] Patent No.: 3,711,591
Issued: Jan. 16, 1973
Appl. No.: 53,058
Filed: Jul. 8, 1970

[51] Int. Cl.[3] ..... C01G 43/00

[52] U.S. Cl. ..... 423/10; 423/8; 423/260

[58] Field of Search ..... 423/10, 260, 261

[56] References Cited

U.S. PATENT DOCUMENTS

| | | | |
|---|---|---|---|
| 2,860,031 | 11/1958 | Grimstead | 423/10 |
| 2,866,680 | 12/1958 | Long | 423/10 |
| 2,937,925 | 5/1960 | Blake et al. | 423/10 |
| 3,052,513 | 9/1962 | Crouse | 423/10 |
| 3,243,257 | 3/1966 | Coleman | 423/10 |
| 3,737,513 | 6/1973 | Wiewiorowski et al. | 423/8 |

OTHER PUBLICATIONS

Wick, "Plutonium Handbook", vol. II, pp. 525–552, Gordon & Bread (1967) New York.

Coleman, *Atomic Energy Review,* 2 (#2), pp. 3–50, IAEA (1964) Vienna.

Blake et al., "Synergistic Uranium Extractants: Combination of Neutral Organophosphorus Compounds with Dialkylphosphoric Acids", ORNL-2259, 42 pages, (1959).

Baes, *J. Phys. Chem.,* 60, 805–6 (1956).

*Primary Examiner*—Edward A. Miller
*Attorney, Agent, or Firm*—Irving Barrack

[57] ABSTRACT

A reductive stripping flow sheet for recovery of uranium from wet-process phosphoric acid is described. Uranium is stripped from a uranium-loaded organic phase by a redox reaction converting the uranyl to uranous ion. The uranous ion is reoxidized to the uranyl oxidation state to form an aqueous feed solution highly concentrated in uranium. Processing of this feed through a second solvent extraction cycle requires far less stripping reagent as compared to a flow sheet which does not include the reductive stripping reaction.

8 Claims, 1 Drawing Figure

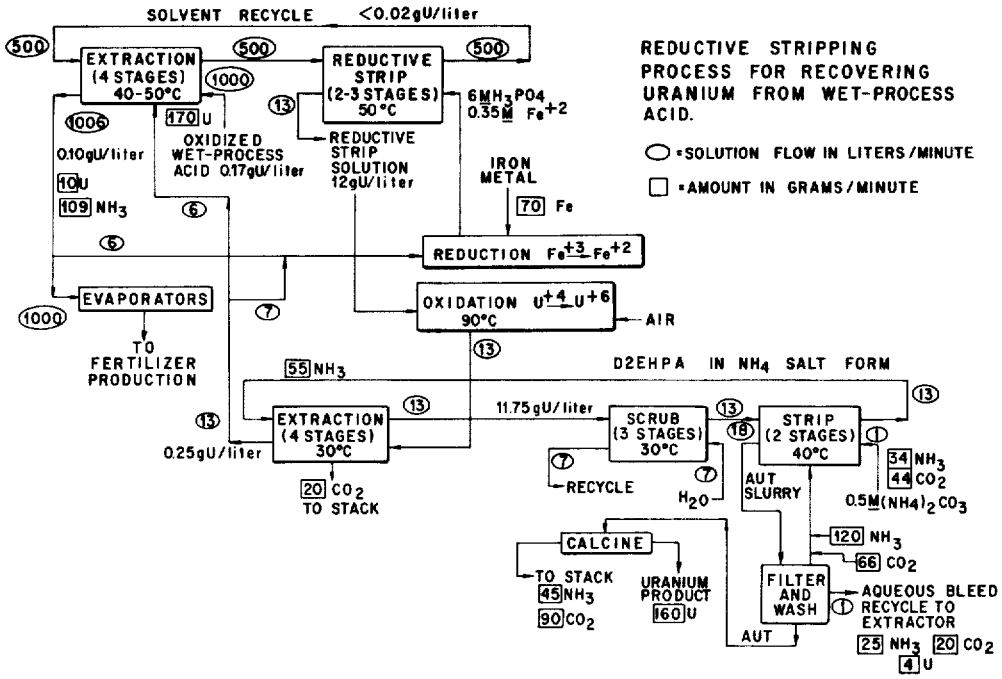

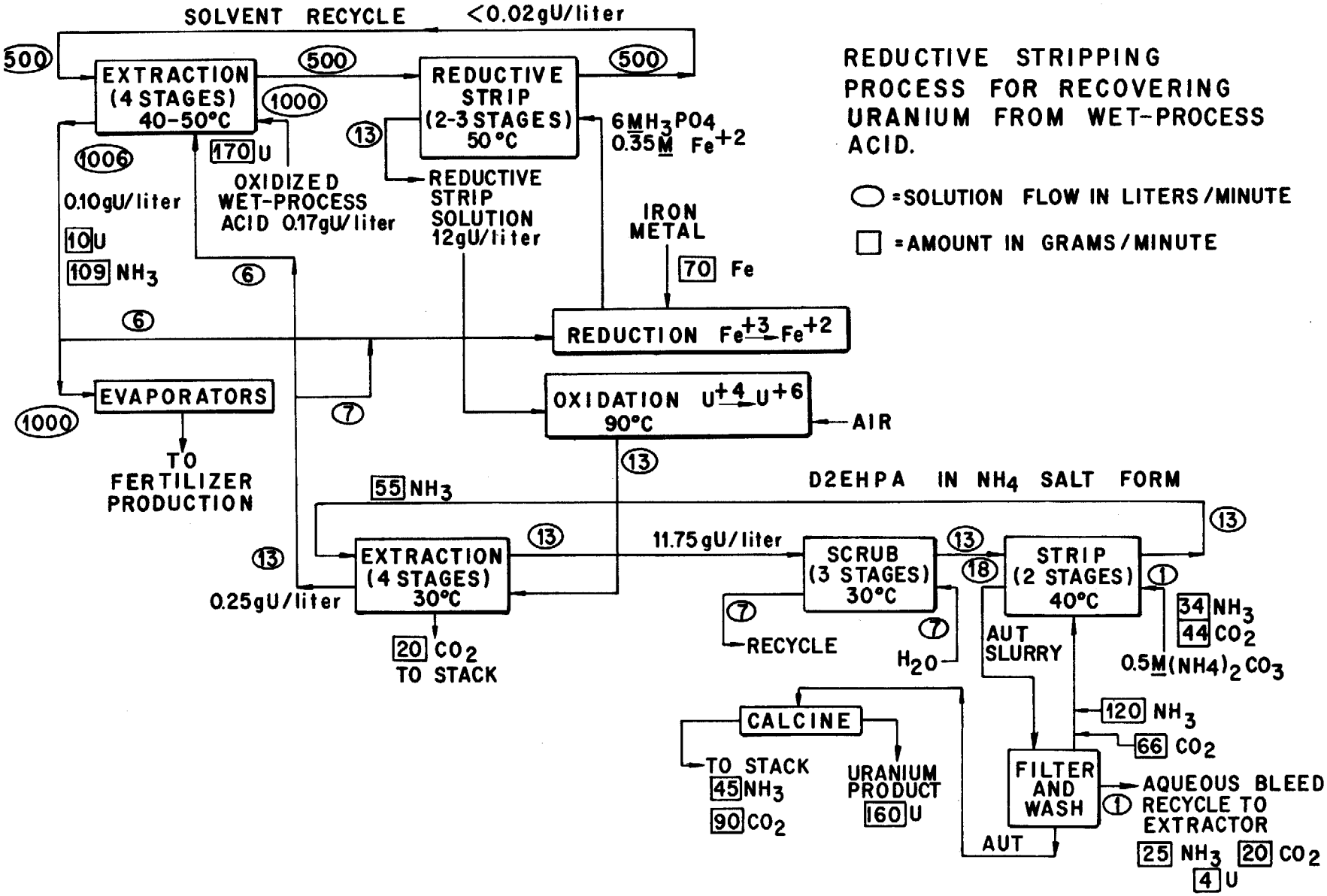
REDUCTIVE STRIPPING PROCESS FOR RECOVERING URANIUM FROM WET-PROCESS ACID.
○ = SOLUTION FLOW IN LITERS/MINUTE
□ = AMOUNT IN GRAMS/MINUTE
SOLVENT RECYCLE
<0.02gU/liter
EXTRACTION (4 STAGES) 40-50°C
REDUCTIVE STRIP (2-3 STAGES) 50°C
6M H3PO4 0.35M Fe+2
REDUCTIVE STRIP SOLUTION 12gU/liter
OXIDIZED WET-PROCESS ACID 0.17gU/liter
170 U
0.10gU/liter
10 U
109 NH3
IRON METAL
70 Fe
REDUCTION Fe+3→Fe+2
OXIDATION U+4→U+6
AIR
EVAPORATORS
TO FERTILIZER PRODUCTION
D2EHPA IN NH4 SALT FORM
EXTRACTION (4 STAGES) 30°C
55 NH3
20 CO2 TO STACK
0.25gU/liter
11.75gU/liter
SCRUB (3 STAGES) 30°C
RECYCLE
H2O
STRIP (2 STAGES) 40°C
AUT SLURRY
34 NH3
44 CO2
0.5M(NH4)2CO3
120 NH3
66 CO2
FILTER AND WASH
AUT
AQUEOUS BLEED RECYCLE TO EXTRACTOR
25 NH3
20 CO2
4 U
CALCINE
URANIUM PRODUCT
160 U
TO STACK
45 NH3
90 CO2

REDUCTIVE STRIPPING PROCESS FOR THE RECOVERY OF URANIUM FROM WET-PROCESS PHOSPHORIC ACID

Matter enclosed in heavy brackets [ ] appears in the original patent but forms no part of this reissue specification; matter printed in italics indicates the additions made by reissue.

BACKGROUND OF THE INVENTION

The present invention relates to an improved process for the recovery of uranium as a by-product of phosphate fertilizer production. More particularly, it relates to a process for the recovery of uranium from the wet-process phosphoric acid that is produced in the treatment of phosphate rock found in Florida and other states of the United States and in several foreign countries. The invention described herein was made in the course of, or under, a contract with the United States Atomic Energy Commission.

The main purpose in mining phosphate rock is to recover a high-phosphate-containing fertilizer. The first step in winning the phosphate from the rock consists of digesting the rock with sulfuric acid under controlled temperature and concentration conditions to produce a phosphoric acid solution and an insoluble calcium sulfate (gypsum). Prior to further treatment to produce a commercially acceptable fertilizer product, this phosphate solution can be processed to remove valuable uranium values provided such processing is economically justified.

It is accordingly an object of this invention to provide a process for the recovery of uranium values from uraniferous phosphate mined deposits that satisfies this criterion.

The phosphate rock mined in Florida contains 0.01 to 0.02 weight percent uranium or from 0.2 to 0.4 pound of uranium per mined ton. While this appears to be a relatively small concentration, it represents a large supply of uranium because of the large amount of phosphate rock processed. For example, it has been estimated that in 1970 the wet-process phosphoric acid produced from Florida phosphate rock [will have] *contained* about 2,000 tons of $U_3O_8$ dissolved therein, representing a significant potential source of uranium.

The so-called "wet-process" phosphoric acid solution resulting from the acidulation of phosphate rock has the following approximate analysis (concentration in grams per liter): 600 $H_3PO_4$, 0.17 uranium, 9 iron, 1 calcium, 30 sulfate, and 27 fluorine. This solution can serve as the aqueous feed for a liquid-liquid solvent extraction process for uranium recovery. In recent years, workers have demonstrated the technical feasibility of solvent extraction as a way to recover uranium from wet-process phosphoric acid. *Some of the earlier teaching concerned with uranium extraction are found in ORNL-2259, "Synergistic Uranium Extractants: Combination of Neutral Organophosphorous Compounds with Dialkylphosphoric Acids" by Blake et al; in ORNL-1903, "The Extraction and Recovery of Uranium (and Vanadium) from Acid Liquors with Di(2-ethyl-hexyl) phosphoric Acid and some Other Organophosphorus Acids" by Blake et al; and in ORNL-2952, "Recovery of Uranium from Di(2-ethylhexyl) phosphoric Acid (Dapex) Extraction with Ammonium Carbonate" by the applicants.* One of the latest efforts is described in ORNL-TM-2522, "Solvent Extraction of Uranium from Wet-Process Phosphoric Acid," by F. J. Hurst et al., [a publication] (*publications* of the U.S. Atomic Energy Commission)[. In that document, a flow sheet is described in which] *wherein* an aqueous uranium-containing phosphate feed solution is contacted with a synergistic extractant combination *of dialkylphosphoric acid and trialkylphosphine oxide, and more specifically an extraction combination* consisting of di(2-ethylhexyl)phosphoric acid (D2EHPA) and trioctylphosphine oxide (TOPO) dissolved in an organic diluent to effect extraction of uranium in the +6 oxidation state. *The synergistic enhancement of the extraction coefficient due to the addition of TOPO was greatest for D2EHPA and other dialkyl phosphoric acids.* While this process represented a significant advance in this technology, it nevertheless suffers from several disadvantages: (1) Appreciable amounts of phosphate and iron are co-extracted into the organic phase and follow the uranium into the stripping solution where they complicate recovery of the uranium product. (2) The use of ammonium carbonate as the stripping reagent results in the conversion of the D2EHPA to a highly hydrated ammonium salt. When the stripped solvent is recycled to the extraction circuit, the extracted water transfers to the aqueous phase and dilutes the wet-process phosphoric acid. This in turn requires additional cost to effect evaporation and reconcentration of the wet-process phosphoric acid. (3) Humic acids are co-extracted from the acid phosphate feed by the organic extractant. These substances form stable complexes with metal ions, both with uranium and other metallic contaminants, to produce problems of phase separation and hindering precipitation of uranium. It is therefore an additional object of the present invention to reduce or eliminate the disadvantages of the process described in ORNL-TM-2522, the disclosure of which is hereby incorporated by reference.

SUMMARY OF THE INVENTION

The present invention is predicated on the discovery of a modified stripping flow sheet which overcomes or at least considerably reduces the aforementioned difficulties and, in addition, allows higher uranium recoveries and decreases chemical reagent costs. Specifically, the present invention calls for a reductive stripping of the uranium from the pregnant organic phase with a reducing agent that converts the uranyl +6 uranium to the less extractable quadrivalent state, causing its transfer to the aqueous phase. The process then calls for reoxidation of the uranium, now at relatively high concentration, to the +6 oxidation state, and using the resultant uranyl phosphate solution as the feed for a second extraction cycle with the same extractant. In the first extraction cycle, the low concentration of uranium in the wet-process acid feed limits the amount of uranium that can be loaded into the organic phase, whereas, in the second cycle wherein the uranium concentration is high, the solvent can be effectively loaded.

The amount of stripping reagent required to recover the uranium from the solvent extract is about inversely proportional to the amount of uranium in the organic phase. Consequently, the amount of stripping reagent required to strip uranium from the solvent extract in the second cycle is considerably reduced (by a factor of 10 to 20) relative to the amount needed to perform the same function if carbonate stripping is employed in the first cycle.

The reductive strip solution consists of an effective concentration of ferrous ion dissolved in at least 5 to 7 molar phosphoric acid solution. A convenient source of strip solution is the aqueous raffinate from the first extraction cycle since it has a suitable iron and phosphoric acid concentration and also contains fluoride ion which catalyzes the reduction reaction. A part of this raffinate is diverted and treated with iron metal to effect reduction of the ferric ion to the desired ferrous state, or the ferric iron may be reduced electrolytically. Thus, the reductive strip solution, which eventually is returned to fertilizer production, represents a minimal charge against the cost of chemical reagents required to conduct the process.

Oxidation of the uranous phosphate strip product solution from the first cycle can be effected by heating in air, by electrolytic oxidation, or by the addition of an oxidizing reagent such as sodium chlorate to the solution. The resulting solution is now concentrated in uranium by a factor of from 70 to over 100 compared to the original wet-process acid feed. In addition the concentrations, relative to uranium, of contaminants such as organic acids and iron are at least a factor of 50 lower than in the original wet-process acid, and higher-grade uranium products, therefore, are obtainable using the two-cycle process.

Once the uranium in the reductive strip solution is oxidized to the uranyl oxidation state it can be treated in a second extraction cycle using the same synergistic organic extractant to decrease the contaminants, consisting principally of iron and phosphate, to a suitable level. In the second extraction cycle, the uranium-loaded solvent is scrubbed with water to remove phosphate impurity and then stripped with ammonium carbonate solution to form an aqueous product solution or slurry of ammonium uranyl tricarbonate (AUT). After filtration and washing the AUT can then be decomposed thermally to yield a high-grade $U_3O_8$ product.

*BRIEF DESCRIPTION OF THE DRAWING*

*The drawing is a flow diagram of a preferred embodiment of the present invention.*

*DETAILED DESCRIPTION OF THE INVENTION*

Having described the invention in general terms, together with salient process parameters, reference will now be made to the FIGURE depicting a representative flow sheet in which the reductive stripping operation is integrated in an over-all process designed to show a typical flow scheme for obtaining the benefits of our invention.

The process begins by oxidizing wet-process acid to ensure that the uranium is in the +6 oxidation state. This can easily be accomplished by adding an oxidizing reagent such as sodium chlorate. The uranium in the wet-process acid can also be oxidized readily by bubbling air through the solution at a temperature in the range 60°–70° C. The oxidized wet-process acid feed is then sent to a first solvent extraction cycle. The process will operate satisfactorily over a temperature range of 25° to 65° C. The rate and cleanness of phase separation improves whereas the uranium extraction efficiency decreases as the temperature is increased. Operation at 40° to 45° C. appears to be about optimum with respect to balancing these effects and the cost of cooling the wet-process acid (usually at 60° to 65° C.) prior to solvent extraction. While contact of the organic and aqueous phases can take place in several ways, it is found that cleaner phase separation occurs when they are mixed with the organic phase as the continuous phase. The uranium-loaded extract is then passed into a reductive stripping zone and contacted in countercurrent fashion with an aqueous solution of preferably about 6 molar phosphoric acid containing from 10 to 20 grams/liter of ferrous ion. As shown in the flow sheet, a portion of the aqueous raffinate passing to phosphate fertilizer production is diverted for treatment with iron metal to reduce the ferric ion to the ferrous state. The reducing solution is then passed to the reductive stripping zone where the uranyl ion in the organic phase passes into the aqueous phase as the reduced uranous form, resulting in a reductive strip solution containing on the order of 12 grams of uranium per liter under the conditions shown. In order to convert the uranium to the desired uranyl form, it is then oxidized by sparging with air at a temperature in the range of about 70° to 90° C. or, alternatively, electrolyzed to effect the same result. The oxidized strip solution now serves as the aqueous feed in a second extraction cycle where ammonium carbonate is used as the stripping agent to recover the uranium as ammonium uranyl tricarbonate (AUT). Contact with the ammonium carbonate strip solution produces either a solution or slurry of the AUT salt; the solubility of the uranium in the product solution is inversely dependent on the ammonium carbonate concentration in this strip solution. Where a sufficiently concentrated strip solution is used, as shown, an AUT slurry is formed which is then easily filtered and washed and subsequently calcined to decompose the AUT salt to $U_3O_8$. It should be noted that in the second extraction cycle the D2EHPA *which* is recycled to the extraction zone *is also* in the hydrated ammonium salt form. However, in this case, the volume of this solution is low relative to the original wet-process acid volume and dilution of the wet-process acid, which goes to fertilizer production, is negligible. Operation of the flow sheet as represented in the FIGURE and as described herein has resulted in an over-all uranium recovery of 94 percent as compared to an average uranium recovery of 82 percent in the absence of a flow sheet which includes the reductive strip operation. Moreover, the chemical reagent cost of ammonia and carbon dioxide in the latter flow sheet has been determined to amount to about 10 cents per pound of uranium recovered as compared to a cost for these reagents of about ninety cents for a flow sheet that does not include the reductive stripping operation.

In the description we have illustrated the extraction of uranium using D2EHPA and TOPO. It should be understood that *synergistic extract* combinations of D2EHPA *or other dialkylphosphoric acids* with other phosphine oxides or phosphonates as disclosed in ORNL-TM-2522 are to be considered as falling within the scope of our invention. *In comparative tests of a number of neutral organophosphorus compounds in combination with D2EHPA, none of the combinations tested had greater extraction power than the combination of D2EHPA and TOPO as shown in the Tables below. These compounds include several phosphine oxides, a diphosphine oxide, a diphosphonate, and two phosphonates. It is anticipated that results obtained with phosphine oxides having n-alkyl chains shorter than n-octyl (e.g., tri-n-hexyl phosphine oxide) will be equivalent to those observed with TOPO inasmuch as they are all trialkyl phosphine oxides. A number of extractants of different types and structure*

*were screened to determine the capabilities for extracting as set forth in the following Tables A-1 and A-2.*

TABLE A-1

*Extraction of Uranium with Synergistic Reagent Combinations*

| | |
|---|---|
| *Organic-phase:* | *0.2 M concentration of an acid reagent plus TOPO in NDD diluent* |
| *Aqueous phase:* | *5.3 M $H_3PO_4$, 0.2 g U(VI)/liter* |
| *Contact:* | *5 min at phase ratio of 1/1; 25° C.* |

| *Acid Reagent* | *TOPO Conc. (M)* | *Uranium Extraction Coefficient ($E_a^o$)* |
|---|---|---|
| *Monoheptadecylphosphoric acid* | *0.0* | *0.10* |
| | *0.05* | *0.15* |
| *di(2-ethylhexyl)phosphoric acid* | 0.0 | *<0.01* |
| *(D2EHPA)* | *0.05* | *2.6* |
| *di(n-decyl)phosphoric acid* | *0.0* | *<0.1* |
| | *0.1* | *2.1* |
| *di(n-octyl)phosphoric acid* | *0.05* | *4.3* |
| *1-hydroxy-2-ethylhexylphosphonic acid* | *0.0* | *0.15* |
| | *0.1* | *0.4* |
| *2-ethylhexyl phenylphosphonate[a]* | *0.0* | *0.9* |
| | *0.1* | *4.0* |
| *Dinonylnapthalenesulfonic acid* | *0.0* | *<0.01* |
| *(DNNSA)* | *0.05* | *0.16* |
| | *0.10* | *0.70* |
| | *0.15* | *1.3* |
| | *0.20* | *2.1* |
| | *0.25* | *2.6* |
| | *0.30* | *3.0* |

*[a]0.4 M*
*NDD = n-Dodecane*
*All of the uranium in the tests in this series was present as U(VI).*

*Table A-2*

*Extraction of Uranium with Combinations of D2EHPA and Various Neutral Reagents*

| | |
|---|---|
| *Organic phase:* | *0.18 M D2EHPA, 0.05 M additive, NDD diluent* |
| *Aqueous phase:* | *5.3 M $H_3PO_4$, 0.2 g U(VI)/liter* |
| *Contact:* | *5 min at phase ratio of 1/1; 25° C.* |

| *Additive* | *Uranium Extraction Coefficient ($E_a^o$)* |
|---|---|
| *Trioctylphosphine oxide (TOPO)* | *2.6* |
| *Phenyldibutylphosphine oxide* | *1.8* |
| *Butyldiphenylphosphine oxide* | *0.78* |
| *Tri(2-ethylhexyl)phosphine oxide* | *0.41* |
| *Methylenebis(di-n-hexylphosphine oxide)* | *2.5* |
| *Diamylamylphosphonate* | *0.61* |
| *Di(sec-butyl)phenylphosphonate* | *0.11* |
| *Tetrakis(2-ethylhexyl)ethylene Diphosphonate* | *0.26* |

What is claimed is:

1. A process for the recovery of uranium from a wet-process phosphoric acid solution derived from the acidulation of uraniferous phosphate ores which comprises contacting said solution with an organic extractant consisting essentially of di(2-ethylhexyl)phosphoric acid and trioctylphosphine oxide dissolved in an organic diluent, reductively stripping the extractant of uranium with a strip solution in which ferrous ion is used to reduce uranyl ions in the extractant to uranous ions in the strip solution, disengaging the strip solution from the organic phase, contacting said strip solution with an oxidizing reagent which converts quadrivalent uranium to hexavalent form, and then passing the resultant solution through a second liquid-liquid solvent extraction cycle where the uranium is stripped from the organic phase with an aqueous solution of ammonium carbonate to produce a product consisting essentially of ammonium uranyl carbonate.

2. The process according to claim 1 in which the reductive strip solution contains from 5 to 20 grams per liter of ferrous ion dissolved in a 5 to 7-molar solution of phosphoric acid.

3. The process according to claim 1 in which the ammonium uranyl tricarbonate product is converted to an oxide of uranium.

*4. Process for obtaining uranium values from a synergistic extractant comprising a dialkylphosphoric acid and a trialkylphosphine oxide dissolved in a water-immiscible organic solvent which comprises stripping the extractant with a 5- to 7-molar aqueous phosphoric acid solution having dissolved therein a divalent iron salt.*

*5. The process according to claim 4 wherein the aqueous phase is oxidized after uranium stripping.*

*6. Process according to claim 4 wherein said phosphoric acid solution contains dissolved therein from 5 to 20 grams of divalent iron per liter of solution.*

*7. A process for the recovery of uranium from a wet-process phosphoric acid solution derived from the acidulation of uraniferous phosphate ores which comprises contacting said solution with an organic extractant consisting essentially of di(2-ethylhexyl)phosphoric acid and trioctylphosphine oxide dissolved in an organic diluent, reductively stripping the extractant of uranium with a strip solution in which ferrous ion is used to reduce uranyl ions in the extractant to uranous ions in the strip solution, and disengaging the strip solution from the organic phase.*

*8. Process for obtaining uranium values from an extractant comprising di-(2-ethylhexyl)phosphoric acid and a trioctylphosphine oxide dissolved in a water-immiscible organic solvent which comprises stripping the extractant with an aqueous phosphoric acid solution containing from about 40 to 85 percent by weight $H_3PO_4$ having dissolved therein a divalent iron salt.*

* * * * *